United States Patent
Kulack et al.

(10) Patent No.: US 7,865,951 B2
(45) Date of Patent: *Jan. 4, 2011

(54) SECURITY ENHANCEMENTS FOR PERVASIVE DEVICES

(75) Inventors: Frederick Allyn Kulack, Rochester, MN (US); Scott Alan Moore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 385 days.

This patent is subject to a terminal disclaimer.

(21) Appl. No.: 11/862,535

(22) Filed: Sep. 27, 2007

(65) Prior Publication Data

US 2008/0072330 A1 Mar. 20, 2008

Related U.S. Application Data

(60) Continuation of application No. 11/535,166, filed on Sep. 26, 2006, now Pat. No. 7,290,136, which is a division of application No. 10/345,646, filed on Jan. 16, 2003, now Pat. No. 7,134,015.

(51) Int. Cl.
*G06F 21/20* (2006.01)

(52) U.S. Cl. ............ 726/20; 726/17; 726/21; 713/168

(58) Field of Classification Search ........... 713/164, 713/166, 167, 184, 193, 194
See application file for complete search history.

(56) References Cited

U.S. PATENT DOCUMENTS

| | | | |
|---|---|---|---|
| 4,910,660 A | 3/1990 | Li | |
| 5,398,300 A | 3/1995 | Levey | |
| 5,606,668 A | 2/1997 | Shwed | |
| 5,828,893 A | 10/1998 | Wied et al. | |
| 5,949,045 A | 9/1999 | Ezawa et al. | |
| 5,968,176 A | 10/1999 | Nessett et al. | |
| 6,289,460 B1 * | 9/2001 | Hajmiragha | 726/28 |
| 6,374,145 B1 * | 4/2002 | Lignoul | 700/17 |
| 6,456,958 B1 * | 9/2002 | Xydis | 702/158 |

* cited by examiner

*Primary Examiner*—Jung Kim
(74) *Attorney, Agent, or Firm*—James R. Nock

(57) ABSTRACT

A method, apparatus, and program product for tiered, multi-state intelligent detection and enforcement of security on a pervasive device is provided. The method/apparatus first monitors the pervasive device for the presence of a security identifier, then establishes a current security level chosen from a plurality of security levels for the pervasive device based on the presence of the security identifier.

10 Claims, 8 Drawing Sheets

SECURITY ENHANCEMENTS FOR PERVASIVE DEVICES

CROSS-REFERENCE TO RELATED APPLICATION

This application is a continuation of U.S. patent application Ser. No. 11/535,166 filed on Sep. 26, 2006 by Frederick A. Kulack et al, entitled "SECURITY ENHANCEMENTS FOR PERVASIVE DEVICES" (now U.S. Pat. No. 7,290,135), which is a division of U.S. application Ser. No. 10/345,646 filed on Jan. 16, 2003 by Frederick A. Kulack et al., entitled "SECURITY ENHANCEMENTS FOR PERVASIVE DEVICES" (U.S. Pat. No. 7,134,015), which are incorporated by reference herein in its entirety.

FIELD OF THE INVENTION

The present invention relates generally to pervasive devices, and more specifically to security enhancements to pervasive devices.

BACKGROUND OF THE INVENTION

Pervasive devices (e.g., personal data assistants (PDAs), cellular smartphones, etc.) have become increasingly popular in today's mobile environment. In fact, these new, pocket-sized devices often encompass advanced functionality which rival capabilities of personal computers. Powerful pervasive devices small enough to fit in one's pocket, often complemented with wireless wide-area coverage, offer an appealing alternative to much bulkier and heavier laptop computers.

Mobile pervasive devices with and without wireless access are used for creating and storing confidential information every day. It is common for the pervasive device user to keep information such as passwords, credit card numbers, customer lists and client information on these devices. The very features that make pervasive devices so useful, such as extreme portability and ready access to critical data, also create a serious security risk. In most instances, the actual cost of hardware replacement is negligible compared to the potential liability for compromised sensitive data.

Several approaches have been developed to address the security concerns with the loss/theft of pervasive devices. A first major approach involves the use of a password to protect the pervasive device. Almost all pervasive devices offer some sort of built-in, power-on password to protect the device. However, a recent report from @stake, Inc. reveals that such password protection can be easily circumvented in a relatively easy, straightforward method (http://www.atstake.com/research/advisories/2001/a030101-1.txt).

Several "add-on" security products have been developed by third-party vendors for pervasive devices. A first example of such a product is TealLock™ from TealPoint Software. This product is configurable to lock down the device during certain hours rendering it useless during off-hours. Another product is PDASecure™ from Trust Digital, which allows a device user to set a password and lock access to certain applications. Yet another product, Sign-On™ from Communication Intelligence Corporation, utilizes biometric signature verification to keep the data on the pervasive device safe. In this product, a matching signature is entered onto the screen of the pervasive device, then the software compares this signature against a stored signature. The software senses not only the form of the signature, but also the speed and rhythm of the signing.

Another approach to safeguarding information within a pervasive device centers on the use of encryption/decryption techniques to protect the data. Encryption uses mathematics or specific algorithms to convert documents, e-mails, or other data files into scrambled data. Encryption ensures that private communications or files are not accessed by unauthorized persons. There are several programs currently on the market that offer this level of protection.

PDADefense™ from Asynchrony.com, is intended to provide PDA users with a high level of defense by "bombing" or deleting information on the PDS is there are any unauthorized attempts to access such information on the PDA device. FileCrypto™ from F-Secure is an automatic file encryption application for encrypting the data of all record-based applications when the device goes to sleep or is shut down.

The password/encryption approaches outlined above have some common disadvantages. Although technically sufficient, passwords and encryption can be difficult (i.e., due to the special handwriting recognition "grafitti" required, or a limited keyboard/keypad) or cumbersome (i.e., the device is often used for a very short period of time). This causes many pervasive device users to avoid passwords altogether, or to use trivial, easily defeatable passwords (e.g., a 4-character PIN, or a simple button combination).

Also, the approaches to security outlined above are "all-or-nothing" type of approaches. That is, the security feature is fully engaged or not engaged at all. There is no concept of risk-assessment based on the current status of the device, and coupling the risk assessment to an appropriate level of security protection for the device.

There is a need for a tiered, multi-stage intelligent detection and enforcement of security on pervasive devices. Such security measures should be minimally intrusive to the device operator, and cost-effective to implement.

SUMMARY OF THE INVENTION

The present invention provides an apparatus and method for tiered, multi-state intelligent detection and enforcement of security on a pervasive device. The method/apparatus first monitors the pervasive device for the presence of a security identifier, then establishes a current security level chosen from a plurality of security levels for the pervasive device based on the presence of the security identifier.

In one embodiment, the security identifier is an identification signal broadcast by an indicator device in proximity to the pervasive device. In this embodiment, the step of monitoring the pervasive device for the present of a security identifier includes periodically detecting the presence of the identification signal on a predetermined time interval and measuring the elapsed time from the last detection of the identification signal. The step of establishing a current security level includes the step of comparing the elapsed time from the last detection of the identification signal to one or more predefined threshold levels, then determining the current security level for the device based upon where the elapsed time falls within the predefined threshold levels. In one embodiment, the amount of identification information required to be provided by the user to access the device is adjusted based upon the current security level.

In an embodiment, the pervasive device is placed at a low risk security level if the elapsed time from the last detection of the identification signal is less then a first threshold value. In this state, a user is not required to enter a password to use the device. However, if the elapsed time from the last detection of the identification signal exceeds the first threshold value, the pervasive device is placed at an elevated risk level, and the user of the device is required to enter a user identifier to access the device. In this embodiment, the detection of the identification signal while the device is at the elevated level causes the device to once again return to the low risk security level. If the user fails to successfully enter a user identifier to access the device when the device is at an elevated risk level, the device assumes an even higher risk security level, where the user is required to enter a more complex user identifier to access the device. If the user fails to successfully provide the complex user identifier to access the device while at the even higher security level, the device enters an extremely high (e.g., exploit) security level. In another embodiment, if the number of identification signals received within a predetermined time period exceeds a predetermined threshold, the device also enters the exploit security level. In one embodiment, if the device is at the exploit security level for more than a second threshold time period, user sensitive information on the pervasive device is destroyed. In alternative embodiments, the indicator device may be either an active or passive device. In one embodiment of the present invention, the identification signal broadcast by the indicator device is an encrypted identification signal.

In one embodiment of the present invention, the security identifier is a user-entered password. In this embodiment, failure to enter a successful user password in a predetermined number of retries increases the security level of the pervasive device, and as the security level of the pervasive device increases, the complexity of the user password correspondingly increases.

The present invention further provides a pervasive device security system having a multi-stage security feature. The pervasive device security system includes a pervasive device containing sensitive data in a memory, the pervasive device including a receiver for receiving a security identification signal. The pervasive device security system further includes an indicator device having a transmitter for transmitting the security identification signal, the indicator device typically positioned within broadcast proximity of the pervasive device.

In one embodiment of the present invention, the pervasive device security system further includes processor for measuring the elapsed time since the presence of the security identification signal has been last received. The processor also compares the elapsed time from the last detection of the identification signal to one or more predefined threshold levels, and determines the current security level for the pervasive device based upon the where the elapsed time falls within the one or more predefined threshold levels. The pervasive device security system includes a user interface which receives input from a user of the pervasive device. Finally, the pervasive device further includes a security state indicator for displaying information about the current security level of the device.

DETAILED DESCRIPTION OF THE PREFERRED EMBODIMENTS

Figure 1:
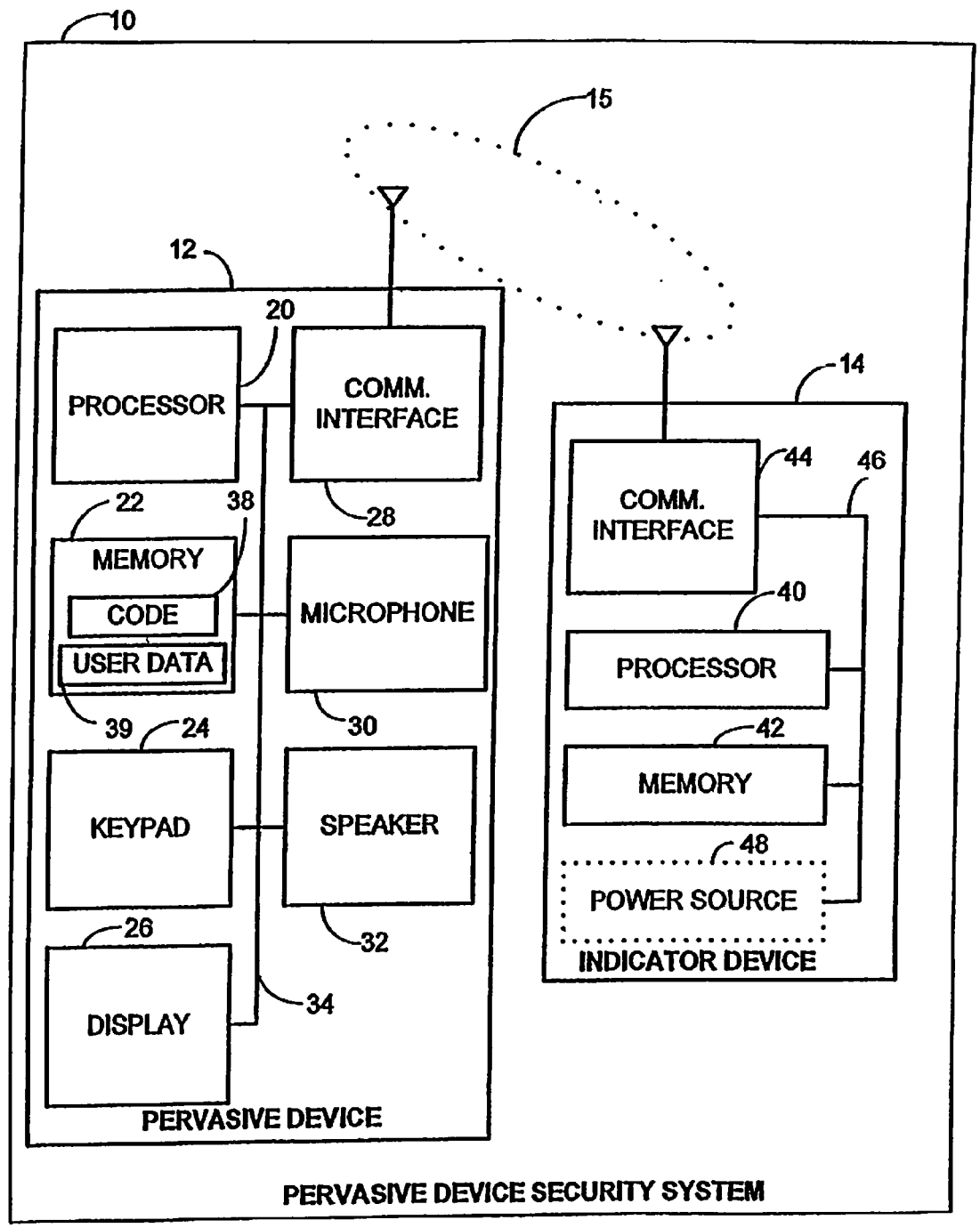
FIG. 1 illustrates a pervasive device security system in accordance with the present invention.

Turning to the Drawings, wherein like numbers denote like parts throughout the several views, FIG. 1 illustrates an exemplary embodiment of a pervasive device security system 10 consistent with principles of the present invention. As shown, pervasive device security system 10 includes a pervasive device 12 and an indicator device 14. In a preferred embodiment of the present invention, pervasive device 12 is any device capable of being imbedded with one or more computer chips to connect the device to a network of other devices. The most common examples of pervasive devices 12 are small, portable electronic devices such as personal digital assistants (PDAs) or cellular smart phones, however pervasive devices may also include devices ranging from clothing to tools to appliances to cars to homes to the human body or even a coffee mug.

As seen in FIG. 1, the pervasive device security system 10 may take a variety of forms, but the functional elements of each pervasive device 12 and indicator device 14 contain some common functional elements. As shown in FIG. 1, the typical pervasive includes a processor 20 capable of executing code, a memory 22 for storing code 38 and user data 39 for the processor 20, a keypad 24, a display 26 and a communications interface 28. A microphone 30 and/or a speaker 32 may also be included. These elements are interconnected such as via a bus 34. Processor 20 is capable of networking with another pervasive device 12 or an indicator device 14 through communication interface 28. Communications interface 28 includes a receiver for receiving an identification signal transmitted by indicator device 14. Users of pervasive device 12 are able to interact with the program embodied in code 38 executed by processor 20, through keypad 24 and a display 26, or alternatively microphone 30 and/or speaker 32. Exemplary code may include applications and operating systems such as PalmOS™, and Microsoft's Pocket PC™ operating system. However, other operating systems could provide similar functionality without departing from the spirit of the invention.

Indicator device 14 is preferably a small form factor device which is capable of communication with pervasive device 12. In alternative embodiments, indicator device 14 can be imbedded into a small, unobtrusive device that can be readily carried by an individual, such as a key chain, ring, earring, card in a purse or wallet, etc. The most important characteristic of indicator device 14 is that it can be detected in broadcast proximity 15 to pervasive device 12 (i.e., an identification signal can be broadcast by indicator device 14 and detected by pervasive device 12). Indicator device 14 serves as a wireless "key" for the operation of pervasive device 12. That is, pervasive device 12 detects the presence of indicator device 14 in proximity to the pervasive device, then establishes an appropriate security level for the pervasive device based on the presence (or absence) of the indicator device.

Indicator device 14 can be either an active device (i.e., a power source such as a battery is present within the indicator device) or a passive device (i.e., there is no active power source present within the device). In a preferred embodiment, passive indicator devices are powered electromagnetically by pervasive device 12.

Indicator devices 14 generally have a processor 40, memory 42, and a communications interface 44. Communications interface 44 typically includes a transmitter for transmitting the identification signal to pervasive device 12. These components are connected by a bus 46. If indicator device 14 is an active device, it will also have a power source 48.

Figure 2:
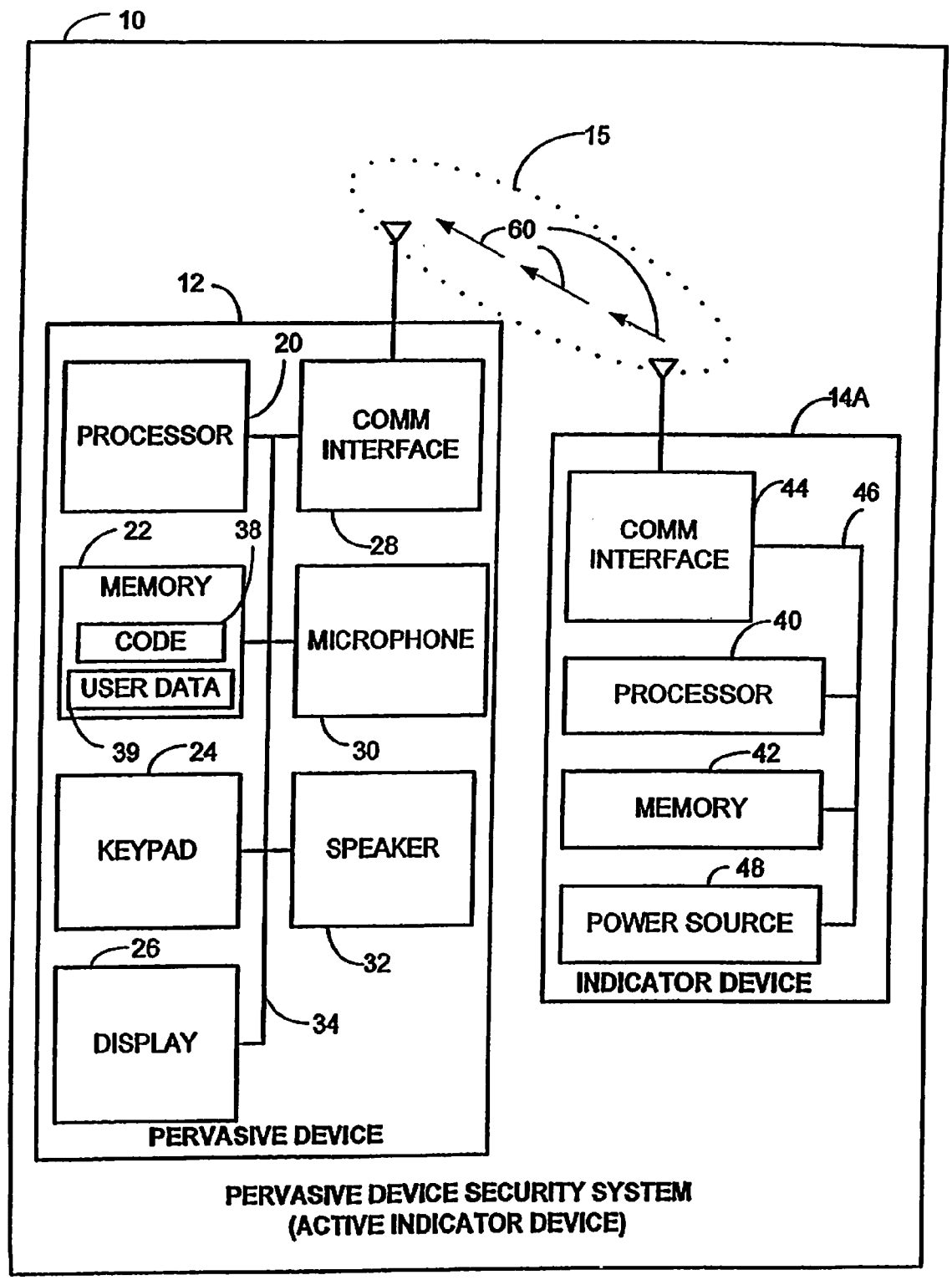
FIG. 2 illustrates a first preferred embodiment of the present invention, wherein the indicator device is an active device.

FIG. 2 illustrates a first preferred embodiment of the present invention, wherein indicator device 14A is an active device. In this embodiment, indicator device 14A actively broadcasts an identification signal 60 which is detected by pervasive device 12. Signal 60 may have several forms. In its simplest form, signal 60 is a low power, limited range RF signal broadcast at a fixed frequency. In other embodiments, signal 60 may include a password or digital encryption key embedded in broadcast signal 60 for even greater security. The password and encryption key may be stored in memory 42, or may be generated by processor 40.

In one embodiment of the present invention, indicator device 14A broadcasts signal 60 via communications interface 44 on a continuous or periodic basis, and pervasive device 12 continuously or periodically attempts to detect the presence of signal 60 from indicator device 14 via communications interface 28.

In an exemplary embodiment, activation of pervasive device 12 (e.g. first button press) causes an immediate check of the presence of the indicator device. While a continuous broadcast of signal 60 from indicator device 14A is preferable from a detection standpoint, power saving concerns may limit the broadcast of indicator signal 60 to a periodic basis (e.g., once a minute). Similarly, while detection of signal 60 is preferably done on a continuous basis for accuracy reasons, periodic detection will offer power savings advantages for pervasive device 12. In the instance of periodic broadcast/reception by indicator device 14A and/or pervasive device 12, care must be taken such that there is a degree/probability of overlap between the broadcast/detection activity (i.e., indicator device 14A and pervasive device 12 must be in active communication mode at the same time). One illustrative example of this is to time synchronize the two devices 12 and 14 such that they are in broadcast/receive mode in approximately the same time window.

Once signal 60 has been detected by pervasive device 12, pervasive device then validates the identity of signal 60 (i.e., the pervasive device determines that the detected signal is indeed from the indicator device 14A). At the simplest level, pervasive device 12 and indicator device 14A are matched to communicate at a common broadcast frequency. For example indicator device 14A broadcasts its signal at a defined frequency, and pervasive device 12 will only validate signals that are broadcast at the defined frequency.

More sophisticated methods of validating the identity of signal 60 may also be employed. As described above, a password/encryption key may be broadcast by indicator device 14A in signal 60. In this instance, pervasive device 12 may either compare the broadcast password with a known password stored in memory 22, or in the case of an encryption key, decrypt the encryption key via processor 20, then compare against a known token.

Once a signal from indicator device 14A has been detected and validated by pervasive device 12, pervasive device 12 resets an internal counter (not shown) indicating the amount of time that has passed since the last signal detection. In this way, the amount of elapsed time since the last detection of signal 60 from indicator device 14A is continuously maintained.

Processor 20 in pervasive device 12 periodically checks this elapsed time to determine if the elapsed time has exceeded one or more predetermined time thresholds. If the elapsed time exceeds one of the predetermined thresholds, this indicates that pervasive device 12 is likely no longer in proximity to the indicator device 14A. This condition, in turn, raises a potential data security risk. As a result, the security level of pervasive device 12 is adjusted to a higher security level.

As the security level of pervasive device 12 is raised, the amount of verification required to use and access sensitive data on the pervasive device is increased accordingly. For example, if signal 60 from indicator device 14A has been recently detected, no user identification may be required to operate and/or access sensitive data on pervasive device 12. However, if the elapsed time from the last detection of signal 60 from indicator device 14A has exceeded a first threshold level (e.g., ten minutes), the user will then be required to validate their identity (e.g., provide a simple password or answer a challenge question) before having access to user sensitive data within the device (i.e., the security level of the device is elevated from "low" risk to "medium" risk). In one embodiment (not shown), if a predetermined number of invalid attempts are made to enter the simple password or respond to the challenge question(s), the device enters a further elevated security level (i.e., "high risk") security level. If the security level is deemed "high risk", a more sophisticated user verification may be required (e.g., longer password or series of challenge questions).

In the case where a user fails to provide a correct password or the user fails to successfully answer a challenge question at the further elevated security level, the security level of the device is once again elevated. In this instance, the security level is deemed to be "exploit" or "extremely vulnerable". When pervasive device 12 is deemed to be at an "exploit" level, additional security measures may be employed to prevent a potential security exposure. In this instance, the identification signal from the indicator device may be required to once again restore access to the confidential information. If the identification signal does not return within a predetermined time interval from the last detection (i.e., the time exceeds a second predetermined threshold), pervasive device 12 may self-destruct user sensitive data, or employ other extraordinary measures to prevent a potential security exposure.

In one embodiment of the present invention, pervasive device 12 displays information about the current security level of the device. In one example, a "blinking red" light emitting diode (LED) positioned on the device indicates an "exploit" security level, "steady red" indicates a "high risk" security level, "yellow" indicates a "medium risk" security level, and "green" indicates a "low risk" security level. Several variations of security level indicators/colors may be employed within the pervasive device, and still remain within the scope and spirit of the present invention.

Figure 3:
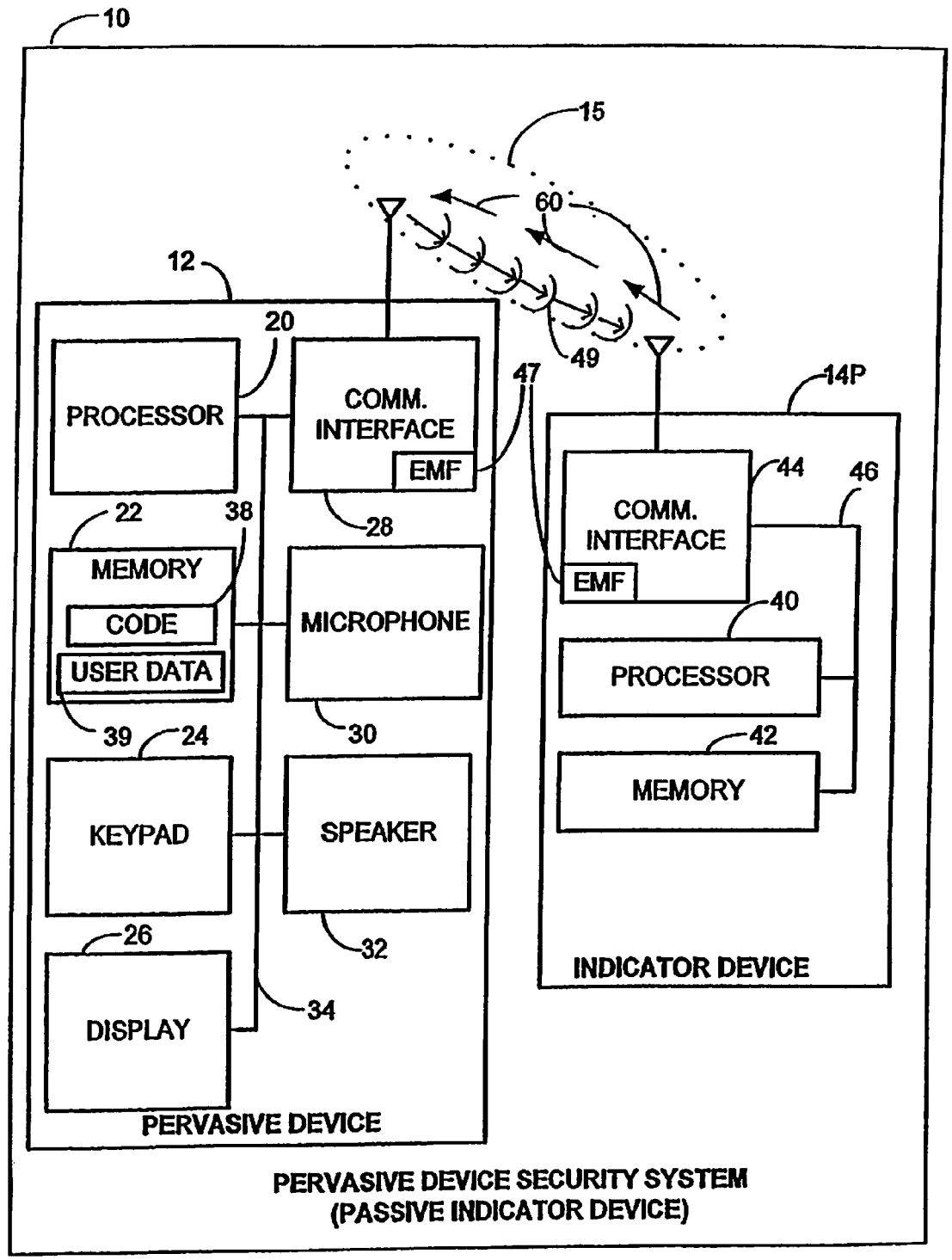
FIG. 3 illustrates a second preferred embodiment of the present invention, wherein the indicator device is a passive device.

FIG. 3 illustrates a second preferred embodiment of the present invention, wherein indicator device 14P is a passive device. In this embodiment, indicator device 14P has no on-board power source, but does have processor 40 and a communication interface 44, including an antenna 45. In this embodiment, indicator device 14P is powered electromagnetically 49 by the pervasive device 12 via EMF interface 47. Indicator device 14P also includes memory 42 that stores an identification code and other pertinent data to be transmitted when the indicator device is activated or interrogated using EMF energy from pervasive device 12. Passive indicator devices 14P generally are smaller, lighter and cheaper than active indicator devices 14A, and their usable life is virtually unlimited. However, passive indicator devices 14P have a limited operational range, and a relatively high-powered pervasive device 12 is required to interrogate and activate the passive indicator device 14P. Passive indicator device 14P typically operates in a low-frequency range (e.g., between 30 kilohertz and 500 kilohertz) which generates a strong and broad signal spread. In this frequency range, the transmission range is somewhat limited.

FIG. 4 is a flow diagram illustrating an exemplary method of providing tiered, multi-stage intelligent detection and enforcement of security on a pervasive device, shown generally at 400. The method begins at block 402. At block 404, the pervasive device is activated and the current risk level for the pervasive device is set to the last known level. At block 406, it is determined if the current risk level is "low". If not, control passes to block 416 on FIG. 4B via connector A. If the current risk level is low, control passes to block 408 where it is determined whether an indicator device is present (i.e., is an identification signal from indicator device detected by pervasive device). If an indicator device is present, control passes to block 410, where the elapsed time counter is reset. If the indicator device is not detected, control passes to block 412, where it is determined if the elapsed time counter is greater than a first threshold value. In a preferred embodiment, first threshold value is a user customizable value specified in a configuration file for the pervasive device (see FIG. 5). If the elapsed time counter is greater than the first threshold value, control passes to block 414, where the current risk level is set to "medium" then control passes to block 418, via connector B. If the elapsed time counter is not greater than the first threshold value control passes to block 413 where user access to the device is enabled, then control passes back to block 408, where the routine once again checks for the presence of an indicator device. In an alternative embodiment (not shown), a delay block may be inserted in the return path between blocks 413 and 408.

Figure 4A:
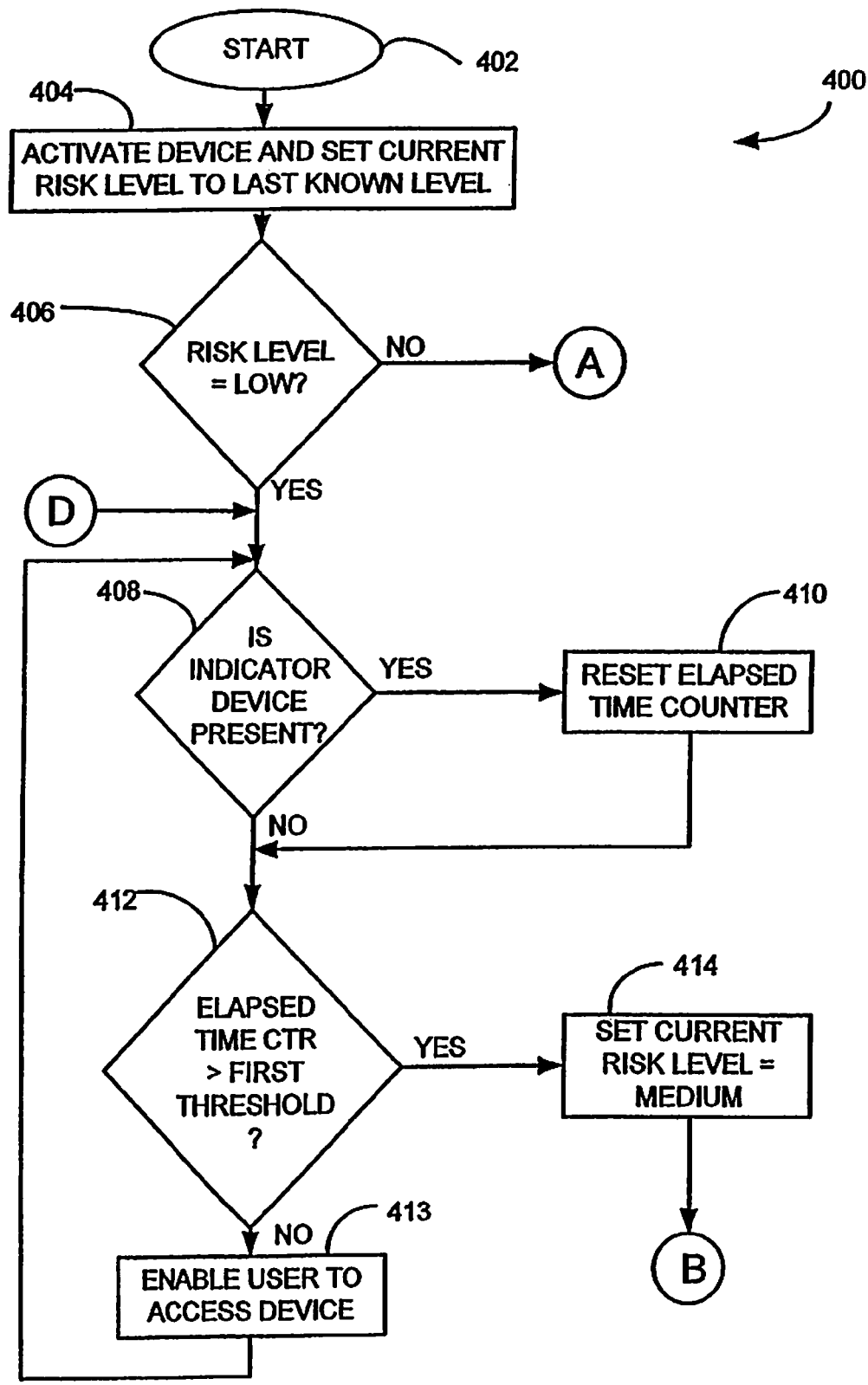
FIGS. 4A, 4B, 4C and 4D are flow diagrams illustrating an exemplary method of providing tiered, multi-state intelligent detection and enforcement of security on a pervasive device in accordance with the present invention.
Figure 4B:
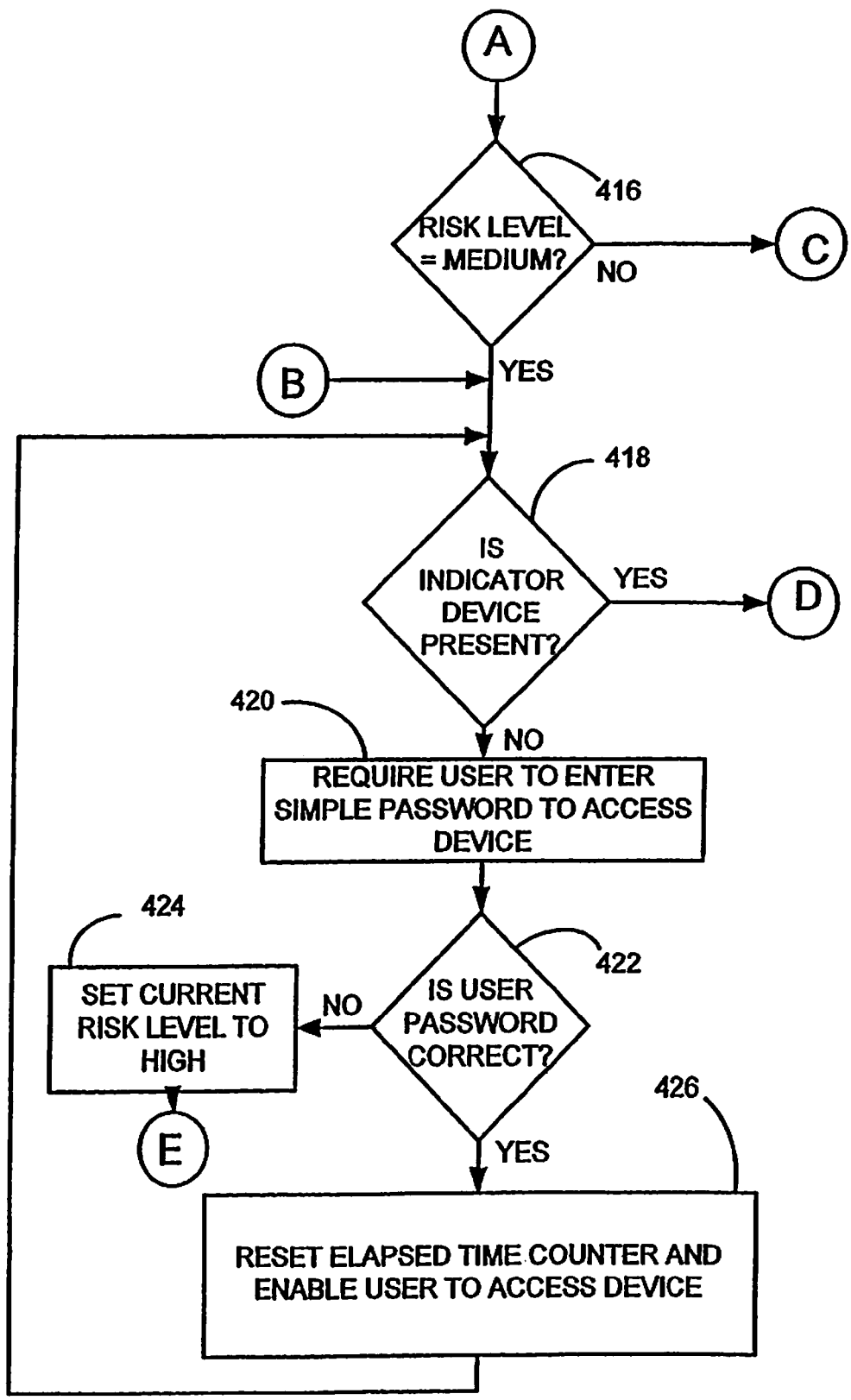

Proceeding now to FIG. 4B, at block 416, it is determined if the current risk level is medium. If not, control passes to block 428 on FIG. 4C via connector C. If the current risk level is medium, control passes to block 418, where it is determined if the indicator device is present. If so, control passes to block 408 on FIG. 4A via connector D. If the indicator device is not present, control passes to block 420, where a user of the device is required to enter a simple password in order to access the pervasive device. At block 422, it is determined if the user password is correct. In a preferred embodiment, the number of retries for entry of the simple password is a user defined parameter specified in a configuration file for the pervasive device (see FIG. 5). If the user password is not correctly entered in the specified number of retries, control passes to block 424, where the current risk level is set to "High", then control passes to block 430 on FIG. 4C via connector E. If the user password is correctly supplied, the elapsed time counter is reset and access to the device is enabled for the user, as shown at block 426. Control then passes back to block 418, where the routine once again checks for the presence of the indicator device. In an alternative embodiment (not shown) a delay block may be inserted in the return path between blocks 426 and 418.

Figure 4C:
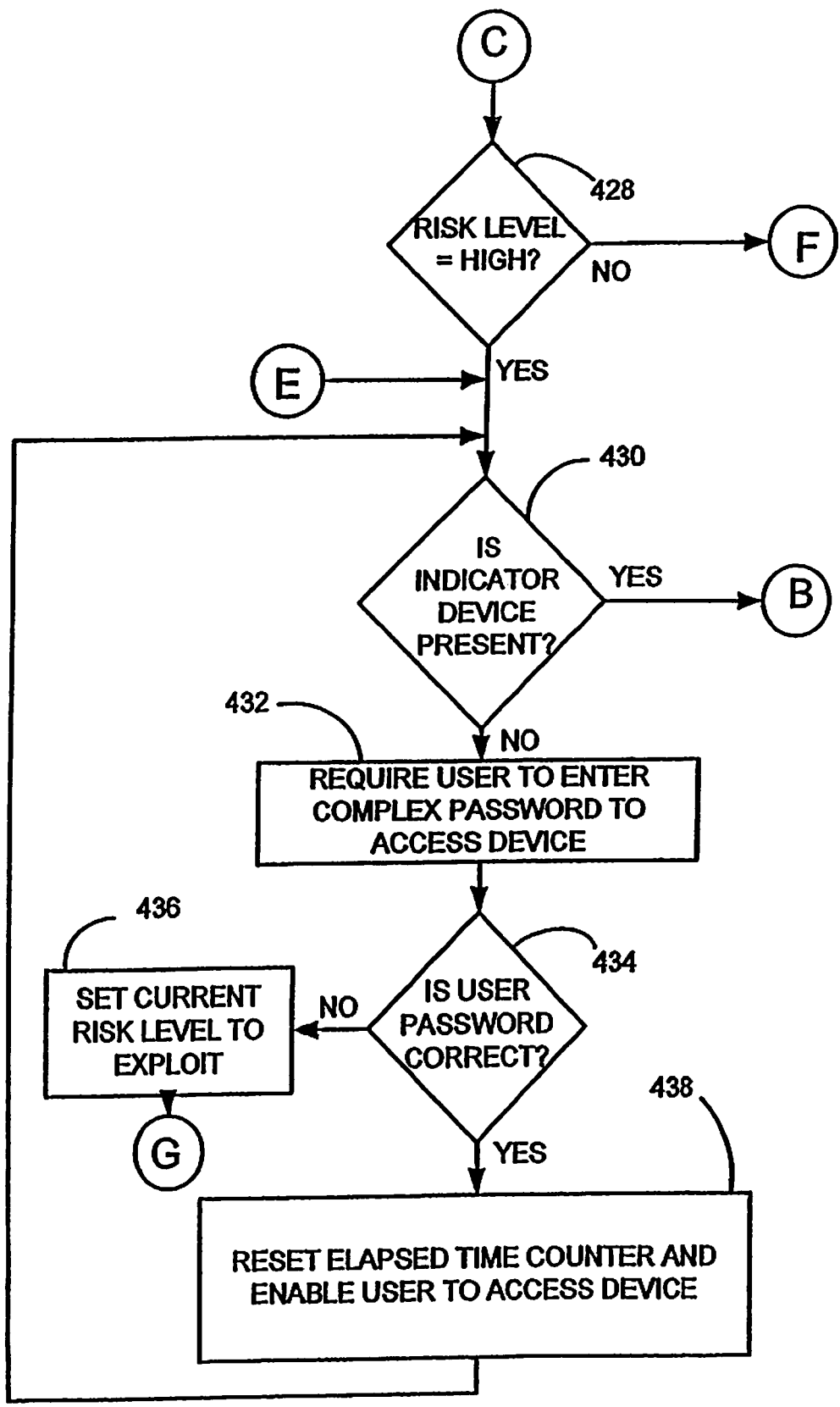

Proceeding now to FIG. 4C, at block 428, it is determined if the current risk level is high. If not, control passes to block 440 on FIG. 4D via connector F. If the current risk level is high, control passes to block 430, where it is determined if the indicator device is present. If so, control passes to block 418 on FIG. 4B via connector B. If the indicator device is not present, control passes to block 432, where a user of the device is required to enter a complex password in order to access the pervasive device. In an alternative embodiment (not shown), the user may be required to answer one or more challenge questions instead of entering a complex password. At block 434, it is determined if the user password or answer to the challenge question is correct. In a preferred embodiment, the number of retries for entry of the complex password is a user defined parameter specified in a configuration file for the pervasive device (see FIG. 5). If the user password is not correctly entered in the specified number of retries, control passes to block 424, where the current risk level is set to "Exploit", then control passes to block 442 on FIG. 4D via connector G. If the user password is correctly supplied, the elapsed time counter is reset and access to the device is enabled for the user, as shown at block 438. Control then passes back to block 430, where the routine once again checks for the presence of the indicator device. In an alternative embodiment (not shown) a delay block may be inserted in the return path between blocks 438 and 430.

Figure 4D:
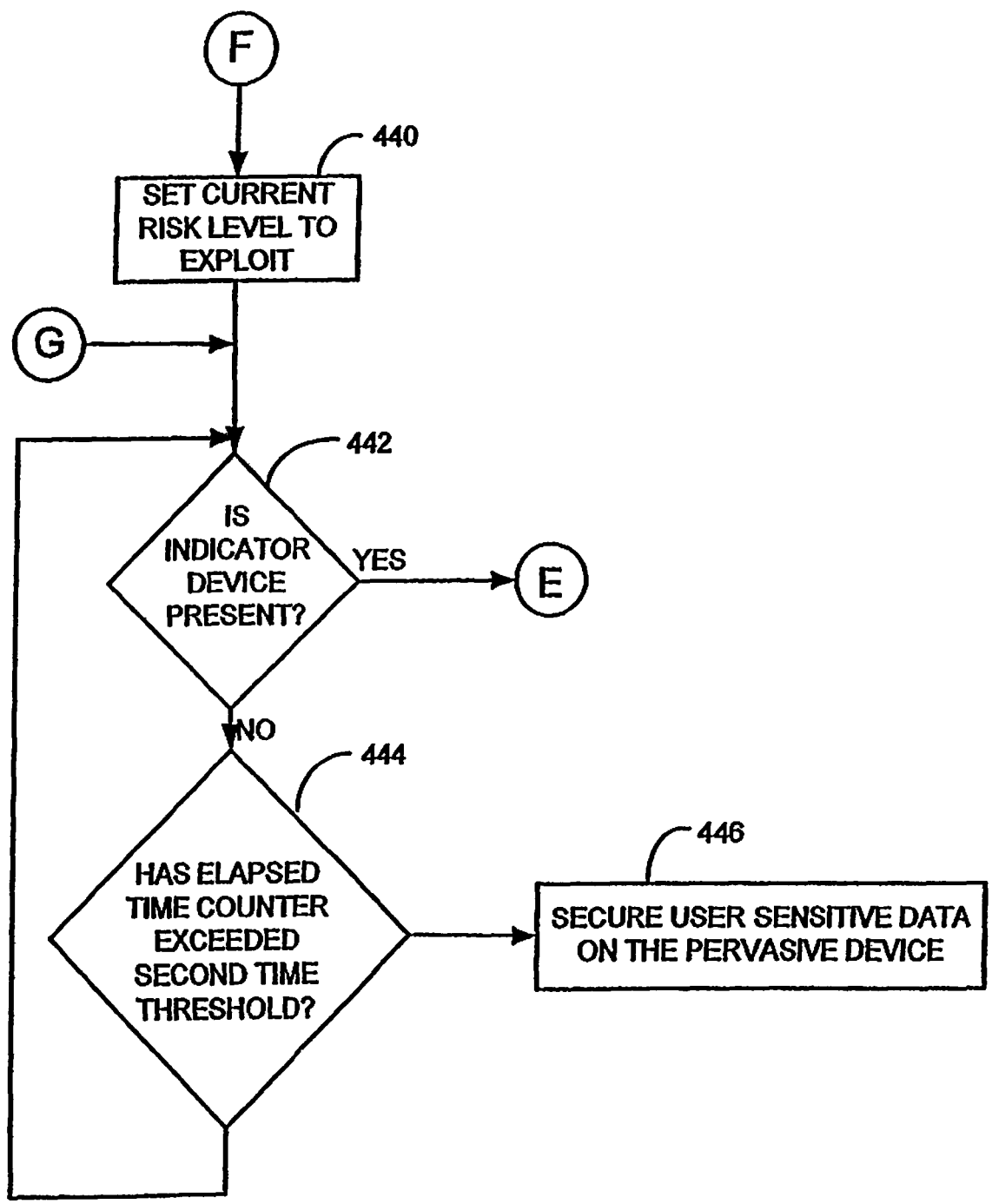

Proceeding now to FIG. 4D, at block 440, the current risk level is set to "Exploit". At block 442, it is determined if the indicator device is present. If so, control passes to block 430 on FIG. 4C via connector E. If the indicator device is not present, control passes to block 444 where it is determined if the elapsed time counter has exceeded a second time threshold. In a preferred embodiment, second threshold value is a user customizable value specified in a configuration file for the pervasive device (see FIG. 5). If the elapsed time has exceeded the second time threshold, control passes to block 446 where user sensitive data is secured on the pervasive device. In one embodiment, the user sensitive data is actually destroyed on the device in order to protect it. If the elapsed time counter has not exceeded the second time threshold, control passes back to block 442, where the routine once again checks for the presence of the indicator device. In an alternative embodiment (not shown) a delay block may be inserted in the return path between blocks 444 and 442.

The number of security levels and the threshold levels presented in this exemplary embodiment are for illustrative purposes only. Thus, the number and type of security levels employed may vary from those presented here, and yet remain within the spirit and scope of the present invention.

It is also contemplated that the security identification provided by the user may also vary and yet remain within the spirit and scope of the present invention. For example, in one embodiment of the present invention, the security identifier may exclusively be a user password. That is, the various security levels employed within pervasive device may be altered exclusively by the correct/incorrect entry of password information (i.e., an indicator device is not utilized at all). In alternate embodiments, the security identifier may be a combination of user passwords and an identifier signal from the pervasive indicator device, or exclusively an identifier signal from the indicator device.

Figure 5:
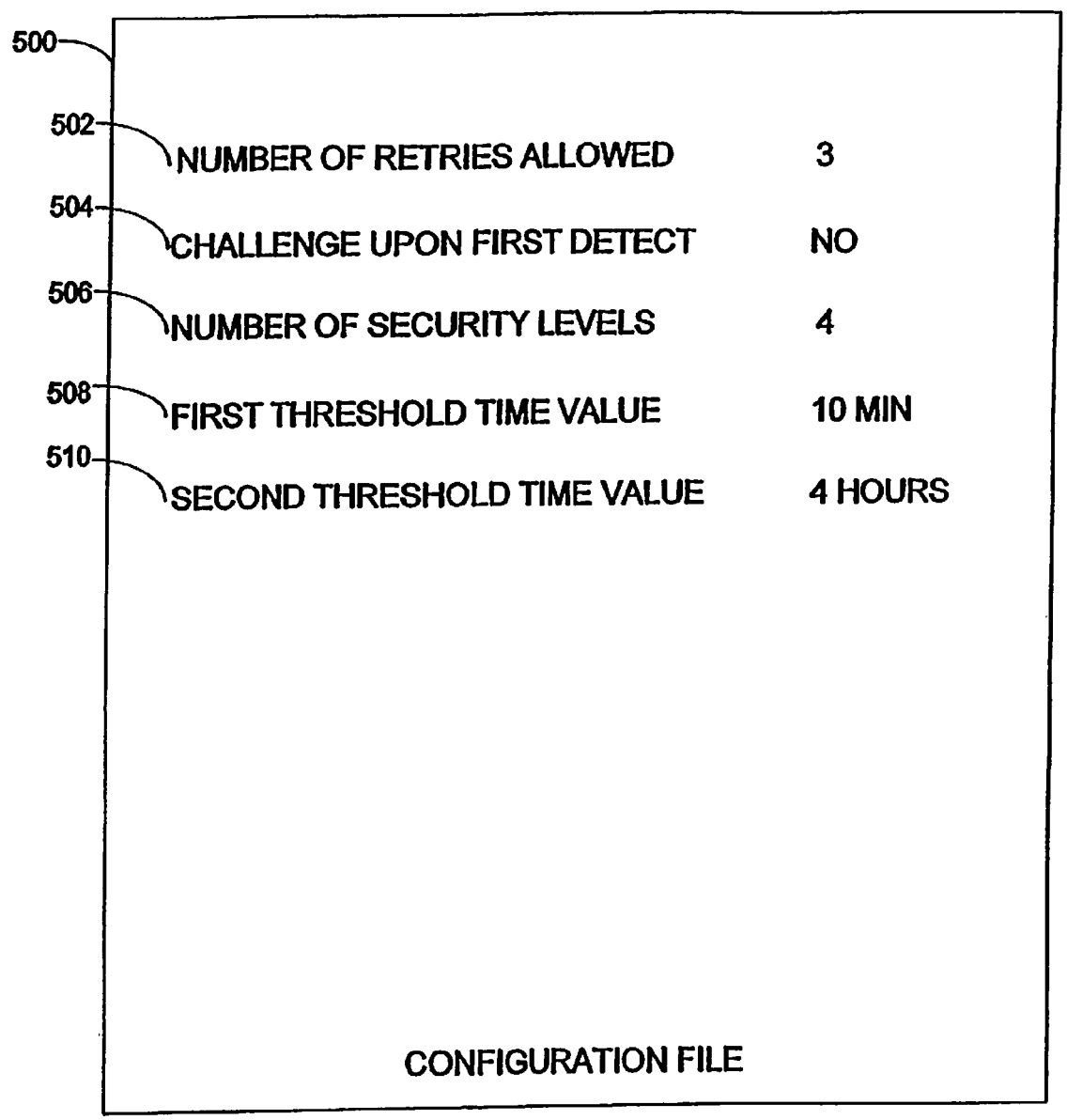
FIG. 5 is an exemplary embodiment of a configuration file for a pervasive device.

It is contemplated that the user/owner of the pervasive device will want to have some control over the number and type of security levels utilized in the device. FIG. 5 is an exemplary embodiment of a configuration file 500 for pervasive device 12, wherein the user can specify a set of custom security controls for the device. For example, row 502 indicates the number of retries a user should be allowed before invalidating a user's attempt to enter a security password. Row 504 enables/disables the option of presenting a security identifier challenge (e.g., password, answer to challenge question, etc.) upon first detection of the indicator device. Row 506 defines the number of security levels used for the device. Row 508 allows the user to define a first threshold value for the amount of time required before the pervasive device assumes a higher security level due to the non-detection of an identification signal from the indicator device. Row 510 enables a user to define a second threshold value for the amount of time required before the pervasive device destroys user sensitive data on the device due to the non-detection of an identification signal from the indicator device.

While the present invention has been illustrated by a description of various embodiments and while there embodiments have been described in considerable detail, it is not the intention of the applicants to restrict or in any way limit the scope of the appended claims to such detail. For example, while the present invention has been described in the context of various pervasive devices, those skilled in the art will appreciate that the mechanisms of the present invention are capable of being distributed as a program product in a variety of forms, such as a program for a pervasive device such as a PDA using Palm OS or another operating system, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

The invention in its broader aspects is therefore not limited to the specific details, representative apparatus and method, and illustrative examples shown and described. Accordingly, departures may be made from such details without departing from the spirit or scope of applicants' general inventive concept. It is intended that the scope of the present invention be limited not by this detailed description, but rather by the claims appended hereto. Therefore, the invention lies in the claims hereinafter appended.

What is claimed is:

1. A method for providing tiered, multi-stage intelligent detection and enforcement of security on a pervasive device, the method comprising the steps of:
    periodically monitoring the pervasive device upon device activation for the presence of a security identifier, wherein the security identifier is an identification signal broadcast periodically by an indicator device in broadcast proximity to the pervasive device, the monitoring step further comprising:
        assigning a current security level chosen from a plurality of security levels to the device based upon a last known security level of the device;
        periodically detecting the presence of the identification signal on a predetermined time interval; and
        measuring the elapsed time from the last detection of the identifier signal; and
    establishing the current security level chosen from the plurality of security levels for the pervasive device based on the presence of the security identifier, the establishing step further comprising:
        comparing the elapsed time from the last detection of the identification signal to a plurality of user predefined threshold levels; and
        determining the current security level for the pervasive device based upon where the elapsed time falls within the plurality of user predefined threshold levels.

2. The method of claim 1, wherein the step of determining the current security level for the pervasive device based upon where the elapsed time falls within the one or more predefined threshold levels further comprises the step of:
    adjusting the amount of identification information required to be provided by a user to access the device based upon the current security level.

3. The method of claim 2, wherein the pervasive device is at a low risk security level if the elapsed time from the last detection of the identification signal is less than a first threshold value.

4. The method of claim 3, wherein a user of the pervasive device is not required to enter a password to use the device when the pervasive device is at the low risk security level.

5. The method of claim 3, wherein the pervasive device is at an elevated risk security level if the elapsed time from the last detection of the identification signal is greater than the first threshold value.

6. The method of claim 5, wherein if the pervasive device is at the elevated risk security level, the detection of the identification signal returns the device to the low risk security level.

7. The method of claim 6, wherein a user of the pervasive device is required to enter a user identifier to access sensitive user information within the pervasive device when the pervasive device is at the elevated risk security level.

8. The method of claim 7, wherein a failure to successfully enter the user identifier when the pervasive device is at the elevated risk security level causes the device to assume an even higher risk security level.

9. The method of claim 8, wherein the even higher risk security level requires the user to enter a complex user identifier in order to access sensitive user information within the pervasive device.

10. The method of claim 9, wherein if the pervasive device is at the even higher risk security level, the detection of the identification signal returns the device to the low risk security level.

* * * * *